(12) United States Patent
Gassmann

(10) Patent No.: US 10,320,277 B2
(45) Date of Patent: Jun. 11, 2019

(54) ELECTRIC DRIVE ASSEMBLY

(71) Applicant: GKN Automotive Ltd., Redditch, Worcestershire (GB)

(72) Inventor: Theodor Gassmann, Siegburg (DE)

(73) Assignee: GKN Automotive Ltd., Redditch, Worcestershire (GB)

( * ) Notice: Subject to any disclaimer, the term of this patent is extended or adjusted under 35 U.S.C. 154(b) by 0 days.

(21) Appl. No.: 15/545,335

(22) PCT Filed: Jan. 29, 2016

(86) PCT No.: PCT/EP2016/051981
§ 371 (c)(1),
(2) Date: Jul. 21, 2017

(87) PCT Pub. No.: WO2016/120472
PCT Pub. Date: Aug. 4, 2016

(65) Prior Publication Data
US 2018/0013338 A1  Jan. 11, 2018

(30) Foreign Application Priority Data

Jan. 30, 2015 (DE) .................. 10 2015 101 367

(51) Int. Cl.
*H02K 49/00* (2006.01)
*B60K 1/00* (2006.01)
(Continued)

(52) U.S. Cl.
CPC .............. *H02K 49/00* (2013.01); *B60K 1/00* (2013.01); *F16H 3/727* (2013.01); *H02K 7/025* (2013.01);
(Continued)

(58) Field of Classification Search
CPC ........ H02K 11/01; H02K 11/33; H02K 11/40; H02K 5/225; H02K 7/025; H02K 7/116; H02K 49/00; F16H 1/32
(Continued)

(56) References Cited

U.S. PATENT DOCUMENTS 2,071,943 A   2/1937 Fraser
4,159,434 A   6/1979 Kalsi
(Continued)

FOREIGN PATENT DOCUMENTS

DE    102009045869 A1    4/2011
DE    102011100596 A1    11/2012
(Continued)

*Primary Examiner* — Bernard Rojas
*Assistant Examiner* — Rashad H Johnson
(74) *Attorney, Agent, or Firm* — Bejin Bieneman, PLC

(57) ABSTRACT

An electric drive assembly for a motor vehicle comprises a high-speed electric machine with a nominal rotational speed of at least 20,000 revolutions per minute and with a high-speed rotor that can be used as a flywheel mass for storing kinetic energy; a superimposed transmission having a drive element, a regulating element and a driven element, wherein the drive element is drivable by an electric machine around a drive axis, wherein the regulating element is rotatable around a regulating axis and wherein the driven element is drivingly connected to the regulating element and the drive element; an electromagnetic regulating device having a stator and a rotor that is connected to the regulating element in a rotationally fixed way, wherein by means of magnetic forces acting in the circumferential direction between the stator and the rotor, a regulating moment can be transmitted to the rotor, wherein the magnetic forces are variably adjustable.

19 Claims, 6 Drawing Sheets

(51) Int. Cl.
*F16H 3/72* (2006.01)
*H02K 7/02* (2006.01)
*H02K 7/116* (2006.01)
*H02K 19/06* (2006.01)
*H02K 16/00* (2006.01)

(52) U.S. Cl.
CPC ............. *H02K 7/116* (2013.01); *H02K 19/06* (2013.01); *B60K 2001/001* (2013.01); *B60Y 2400/162* (2013.01); *B60Y 2410/10* (2013.01); *H02K 16/00* (2013.01); *H02K 2213/09* (2013.01); *Y02E 60/16* (2013.01); *Y02T 10/6204* (2013.01)

(58) Field of Classification Search
USPC ............................. 310/41, 74, 75 R, 83, 99
See application file for complete search history.

(56) References Cited

U.S. PATENT DOCUMENTS

| | | | |
|---|---|---|---|
| 5,929,548 A | | 7/1999 | Pinkerton et al. |
| 5,959,385 A | * | 9/1999 | Kato ..................... F02N 15/046 310/112 |
| 6,354,974 B1 | * | 3/2002 | Kozarekar ............... B60K 6/26 180/65.21 |
| 2005/0073204 A1 | * | 4/2005 | Puterbaugh ............. H02K 5/10 310/89 |
| 2006/0289208 A1 | * | 12/2006 | Katsuhiro ................ B60K 6/44 180/65.225 |
| 2010/0141080 A1 | * | 6/2010 | Tang ....................... H02K 1/165 310/216.111 |
| 2013/0147207 A1 | * | 6/2013 | Metral ................... F02N 15/025 290/38 E |
| 2014/0060484 A1 | * | 3/2014 | Hiramoto ................ F02D 11/10 123/337 |
| 2014/0103761 A1 | * | 4/2014 | Atkins ................... B60K 6/105 310/74 |
| 2014/0378260 A1 | * | 12/2014 | Dewar .................. F16H 1/2818 475/149 |
| 2016/0053856 A1 | * | 2/2016 | Thorwart ................. F16H 1/10 310/68 B |
| 2016/0065106 A1 | * | 3/2016 | Venter ..................... F01D 15/10 290/31 |
| 2017/0328328 A1 | * | 11/2017 | Okada ................ F02N 11/0851 |

FOREIGN PATENT DOCUMENTS

| | | |
|---|---|---|
| DE | 102011084092 A1 | 4/2013 |
| DE | 112010005738 T5 | 6/2013 |
| DE | 102013206650 A1 | 10/2013 |
| FR | 2997047 A1 | 4/2014 |
| GB | 2363173 A | 12/2001 |
| GB | 2405129 A | 2/2005 |
| WO | 2012007030 A1 | 1/2012 |

* cited by examiner

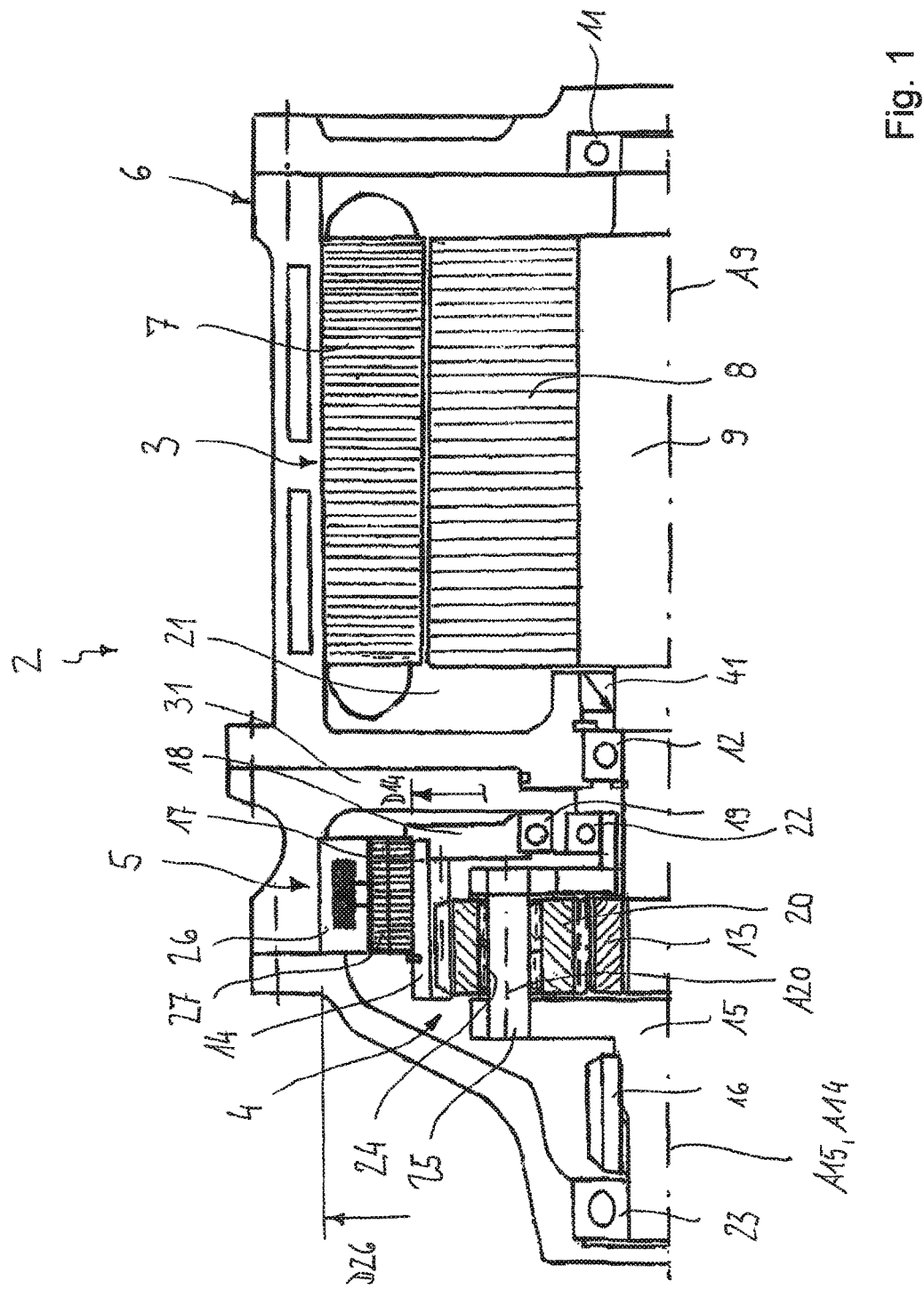

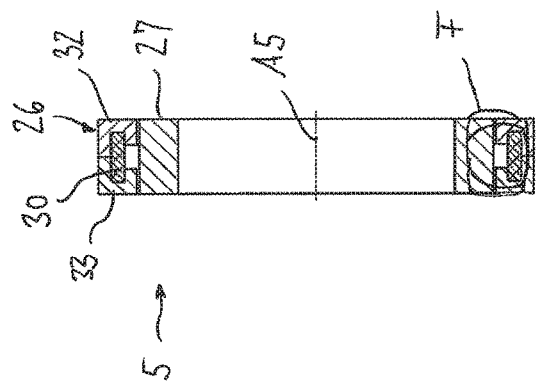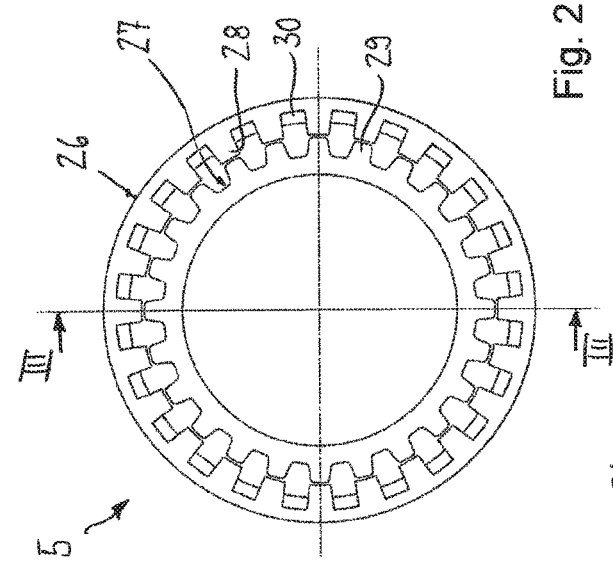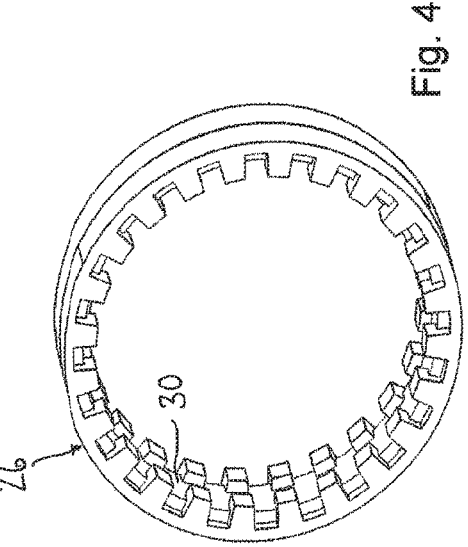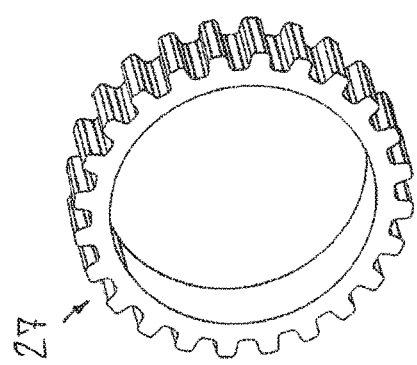

ELECTRIC DRIVE ASSEMBLY

This application is a national stage of, and claims priority to, Patent Cooperation Treaty Application No. PCT/EP2016/051981, filed on Jan. 29, 2016, which application claims priority to German Application No. DE 10 2015 101 367.3, filed on Jan. 30, 2015, which applications are each hereby incorporated herein by reference in their entireties.

The present disclosure relates to an electric drive for driving a drive axle of a motor vehicle as well as to a method of controlling an electric drive. An electric drive commonly comprises an electric motor and a downstream transmission gearing which translates an introduced rotational movement from a high speed to a low speed. The transmission gearing is drivingly connected to a downstream differential drive which divides the introduced torque to two sideshafts for driving the motor vehicle wheels of a vehicle axle.

Such an electric drive can serve as the only driving source for the motor vehicle or it can be provided in addition to an internal combustion engine, wherein the electric drive and the internal combustion engine can drive the motor vehicle individually or jointly in a superimposed manner. Such drive concepts with two driving sources are referred to as "hybrid drives".

From DE 10 2009 045 869 A1 a drive system is known having a first electric motor, a second electric motor, a convertor and a distribution gearing in the form of a planetary gearing. The convertor controls the second electric motor for generating a variable rotational speed and/or a variable torque. The planetary gearing comprises three planetary gears that are connected via a planetary carrier, a sun gear and a hollow gear. The hollow gear forms a first input shaft that is coupled to the electric motor. The sun gear forms a second input shaft that is coupled to the second electric motor. The planetary carrier forms an output shaft. The first electric motor connected to the hollow gear is configured as a synchronous motor that is fed directly by a net alternating voltage so that it rotates at a constant speed. The speed of the first synchronous motor is given with for example 3,000 revolutions per minute. The second synchronous motor shall be configured for a rotational speed range of for example −6,000 to +6,000 revolutions per minute.

From GB 2 363 173 A, a transmission with a first electric motor, a second electric motor and two planetary units is known. A primary drive is provided in the form of an internal combustion engine which drives a flywheel. The flywheel is connected to a planetary carrier of the first planetary unit, which planetary unit, in turn, is connected to the hollow gear of the second planetary unit. The hollow gear of the first planetary unit is connected to the first electric motor. The sun gear of the second planetary unit is connected to the second electric motor. The planetary carrier of the second planetary unit is connected to an output shaft. Said transmission thus comprises four connecting elements, i.e. the externally driven flywheel, the first hollow gear connected to the first electric motor, the second sun gear connected to the second electric motor and the second planetary carrier. The rotational speed of the second electric motor which is configured as a switched reluctance motor is given as a maximum of 16,000 revolutions per minute.

From WO 2012/007030 corresponding to DE 11 2010 005 738 T5 an electric drive for a motor vehicle is known that comprises an electric motor and a transmission unit. The transmission unit comprises a planetary gearing and a differential gearing which are arranged coaxially relative to one another. The planetary gearing comprises two planetary gear stages with different transmission ratios which each comprise a sun gear, a plurality of planetary gears and a hollow gear. The sun gears of the planetary gear stages are driven by the electric motor. The planetary gears are connected via a planetary carrier to the differential cage. The hollow gears can be optionally braked by a clutch assembly relative to a stationary housing, so that different transmission ratios can be achieved.

From DE 10 2013 206 650 A1 an electric drive unit for a motor vehicle is known. The drive unit comprises a rotor, a stator, a first planetary gear set, a second planetary gear set and an engagement mechanism with a clutch brake. The clutch brake can be a disc clutch, a magnetic powder clutch, a clutch with magneto-rheological fluid or a band brake.

From DE 10 2011 100 596 A1 a torque transmitting device is known with an input shaft, an output shaft and a planetary gear set connected therebetween. The planetary gear set comprises a planetary carrier connected to the driveshaft, a plurality of planetary gears and a sun gear connected to the output shaft.

U.S. Pat. No. 2,071,943 proposes an electromagnetic clutch for the driveline of a motor vehicle, via which an input shaft and an output shaft can be smoothly connected.

From FR 2 997 047 A1 there is known an electric drive for a motor vehicle having a planetary gearing and two electric motors. The planetary gearing comprises a sun gear, a planetary carrier, a plurality of planetary gears and a hollow gear. The first electric motor is drivingly connected to the sun gear and the second electric motor is drivingly connected to the hollow gear. The sun gear is firmly connected to a sprocket that can be braked with respect to a housing by a first braking device. A second braking device comprises an outer ring face of the hollow gear for braking same relative to the housing.

At very low speeds and at very high speeds electric drives comprise a relatively low efficiency. At low vehicle speeds, there prevails a very high motor current, with the output torque of the electric motor being very low. At high speeds, the losses of the electric motor increase, as a result of which the efficiency decreases.

At present, there exists a tendency towards using electric motors with higher rotational speeds, towards electric drives with disconnect systems for disconnecting the electric motor from the wheels at higher vehicle speeds, and towards electric motors having a variably adjustable speed (a multi-speed function). Today's electric drives are designed to comprise more than double the nominal engine moment in order to withstand higher torque peaks in the driveline which are caused by high engine inertia paired with a high degree of stiffness of the driveline.

Disclosed herein is an electric drive which comprises a high degree of efficiency and a smooth switchability. Further disclosed is a method of controlling such an electric drive assembly to provide an energy-efficient drive.

An electric drive assembly for a motor vehicle, comprises: an electric machine for driving a drive axle of the motor vehicle, wherein the electric machine is configured as a high-speed electric machine with a nominal speed of at least 20,000 revolutions per minute and comprises a high-speed rotor that can be used as flywheel mass for storing kinetic energy; a superimposed transmission with a drive element, a regulating element and a driven element, wherein the drive element is rotationally drivable by the electric machine around a driving axle, wherein the regulating element is drivable around a regulating axis and wherein the driven element is drivingly connected to the regulating element and the drive element; an electromagnetic regulating device for regulating a rotational speed of the regulating element, wherein the electromagnetic regulating device comprises a stator connected to a stationary component and a rotor connected to the regulating element in a rotationally fixed way, the rotor and the stator are arranged contact-free relative to one another, wherein the electromagnetic regulating device is configured to transmit a regulating moment to the rotor by means of magnetic forces acting in circumferential direction between the stator and the rotor, wherein the magnetic forces are variably adjustable.

The elements of the superimposed transmission are drivingly connected to one another to transmit torque, wherein, in the present disclosure the expression "rotatingly drivable" or "drivingly connected" shall each include the possibility of one or more further components being incorporated in the power path between a driving element and a driven element rotatingly driven by same.

An advantage of the electric drive assembly is that, because of the use of the electromagnetic regulating device that transmits magnetic forces in a contactless way, the electric drive assembly comprises only a small amount of drag losses and thus a high degree of efficiency. Furthermore, because of the configuration of the regulating device, the electric drive is protected against being overloaded. If the total torque in the driveline of the electric drive assembly exceeds the voltage set in the regulating device, the rotor rotates relative to the stator. In this way, torque peaks in the driveline can be compensated for in a wear-free way. A further advantage is that the electromagnetic regulating device can be controlled such that the rotational speed and/or the torque of the driveline of the electric drive can be variably adjusted and/or controlled without changing the input speed and, respectively, the input torque of the high-speed electric machine. The high-speed electric machine which serves as the primary driving source for the electric drive is thus able to operate in a characteristic curve range with a particularly high degree of efficiency.

The embodiment of the primary driving source in the form of a high-speed electric machine is advantageous in that it can store a large amount of kinetic energy which can then again be re-introduced in the form of a mechanical energy into the system or it can be converted into electrical energy and stored in a battery. Overall, the electric drive combines the advantages of a high degree of efficiency and a long service life with a compact design.

The kinetic energy is provided in the form of rotational energy of the rotating high-speed rotor. The storage capacity of the electric machine depends on the rotational speed and the mass inertia of the high-speed rotor. Depending in the storage capacity required, an additional mass can be provided, if necessary, which, either directly or indirectly, is firmly connected to the high-speed rotor so as to jointly rotate therewith. In such a case, the high-speed rotor and the additional mass jointly form the flywheel mass for storing kinetic energy. According to an embodiment, the high-seed electric machine can be configured such that the high-speed rotor can store a kinetic energy of at least 50 kilo-joule, and perhaps at least 100 kilo-joule. This is to include the possibility of the storage capacity being determined by the rotor only, i.e. that no additional mass is provided, or that the rotor, jointly with an additional mass attached thereto comprises said storage capacity.

The amount of magnetic forces generated by the regulating device can be variably adjustable and controllable. This includes in particular that the magnetic forces can be set to zero, so that the rotor can rotate in a force-free way relative to the stator, furthermore that it can be set to a maximum value at which a maximum regulating moment is introduced into the rotor, as well as continuously to each intermediate value between zero and the maximum value. The maximum value can be configured to be such that the rotor is braked relative to the stator and rotates in the opposite direction relative to the drive element of the superimposed transmission; that the rotor is held in a rotationally fixed way relative to the stator or that the rotor is driven relative to the stator and rotates in the same direction as the drive element of the superimposed transmission. In the setting in which the rotor is held so as to be rotationally fixed relative to the stator, the torque introduced by the high-speed electric machine is supported by the regulating device in the circumferential direction and is entirely transmitted to the driven element. Because the magnetic forces acting between the stator and the rotor are continuously adjustable and/or controllable, the regulating moment torque to be transferred to the regulating element can be continuously adjusted. In this way, the electromagnetic regulating device can be used to control the rotational speed of the driven element by suitably controlling the magnetic forces.

The superimposed transmission comprises at least three connecting elements, i.e., the driving element for introducing torque from the primary driving source, the driven element for transmitting torque to the drive axle of the motor vehicle, and the regulating element for controlling the torque and/or the rotational speed in the driveline. Of the three connecting elements, two are rotatable independently from one another, i.e., the transmission has two degrees of freedom. As a result therefrom, rotational movements of two of the three connecting elements that are independent from one another can be superimposed on one another, which is the reason why the transmission is referred to as superimposed transmission. Further, it is possible that the regulating element of the superimposed transmission is operatively connected to the regulating device. The regulating device, by acting on the rotational movement of the regulating element, allows a variable control of the rotational speed and of the torque of the driveline respectively.

According to an embodiment, the high-speed electric machine can be arranged in a sealed dry first receiving chamber. This means in particular that the high-speed electric machine does not run in a lubricating agent. In this way friction losses can be kept low. Preferably, the internal pressure in the first receiving chamber is lower than the environmental pressure and, in particular, is less than 100 millibar. Alternatively or in addition, the electromagnetic regulating device can be arranged in a sealed second receiving chamber which is at least partially filled with a lubricant. This ensures satisfactory lubrication of the electromagnetic regulating device. In case the high-speed electric machine is dry-running and the electromagnetic regulating device is wet-running, the two receiving chambers are sealed relative to one another by suitable sealing means. The two receiving chambers can be fluidically separated chambers of a joint housing of the electric driving assembly.

The regulating device can comprise in particular an electromagnetic clutch or an electric machine. In both embodiments, the regulating device is configured such that the drive torque, and/or the brake torque, acting on the regulating element is variably controllable. In particular, the regulating device can be controlled such that the regulating element and the rotor connected thereto can rotate freely, i.e., in a torque-free manner, or they are held so as to be rotationally supported with respect to a stationary component, i.e., held rotationally fixed, or they can be set into any desired intermediate position in which the regulating element is partially braked relative to the stationary component.

The sizes of the assembly components can be such, that the stator of the regulating device comprises a greatest outer diameter that can be greater than the outer diameter of the greatest drive gear of the superimposed transmission that is arranged coaxially relative to the axis of rotation. Furthermore, the stator of the regulating device can comprise a smallest inner diameter which is greater than a greatest outer diameter of the greatest drive gear of the superimposed transmission. By this configuration, the stator is positioned on a relatively great diameter, so that the braking forces in the regulating device are relatively low.

For the embodiment of the regulating device having an electro-magnetic clutch it is possible that the stator of the regulating device comprises a plurality of circumferentially distributed stator poles and that the rotor comprises a plurality of circumferentially distributed rotor poles, wherein the number of stator-poles and the number of rotor-poles can be the same. The rotor can be made of a magnetic material such as soft iron or electric sheet. The stator comprises a magnetic coil which, by being supplied with current, produces a magnetic field which acts on the rotor.

The magnetic coil is controlled by an electronic control unit, wherein the clutch moment is variably adjustable by controlling the current flowing through the magnetic coil. The electromagnetic clutch reacts extremely quickly, according to the structure of the magnetic field. In more specific terms, the rotational speed of the rotor is set by the pulsing of the electric current of the magnetic coil, wherein by controlling the current accordingly it is possible to achieve a smooth connection and disconnection of the clutch and accurate controllability of the clutch torque. In the disconnected condition of the magnetic coil, i.e., if it is current-free, the rotor can rotate freely relative to the stator. In the course of this, the drag moment of the electro-magnetic clutch is extremely low, i.e., it is affected only by the air and/or oil friction respectively in the radial gap between the rotor and stator. To achieve a connected condition, the coil current can be set such that the rotor stands still relative to the stator, so that the torque introduced into superimposed transmission is supported. It is to be understood that the coil current can also be set to any desired intermediate value between the connected and disconnected condition. In this way, the slip of the rotor relative to the stator and thus the driving torque of the electric drive can be controlled as required. It is even possible that the rotor, by pulsing the coil current accordingly, is driven relative to the stator to a limited extent. In this way, by means of the electro-magnetic clutch, an additional torque can be introduced into the superimposed transmission, and/or the rotational speed of the driven element can be controlled. If the total torque introduced into the superimposed transmission exceeds the coil current as set, the rotor thus rotates relative to the stator. In this case the electromagnetic clutch also operates as a torque limiting clutch without being subject to wear.

The stator of the electromagnetic clutch can comprises a first ring part and a second ring part made of a magnetic material between which the magnetic coil is axially received. The stator poles can be formed by the teeth of an inner tooth structure at the stator, and the rotor poles can be formed by the teeth of an outer tooth structure at the rotor, wherein a radial gap is formed between the tooth heads of the stator poles and the tooth heads of the rotor poles. The number of stator poles and the number of rotor poles is preferably the same. It applies that the greater the number of poles, the greater the clutch and brake moment.

The electromagnetic clutch functions like a reluctance motor which is characterised in that the torque in the rotor is generated entirely by a reluctance force. The rotor of an reluctance motor comprises pronounced poles and consists of a highly permeable, soft magnetic material such as electric sheet. A reluctance motor has the advantage of featuring a long service life because it does not require slip rings and brushes subject to wear.

For the embodiment of the regulating device having a secondary electric machine, it is possible that it can be operated in generator or motor mode by an electronic control unit. The secondary electric machine can be configured as a low-speed electric machine which comprises a relatively low nominal speed of in particular less than 10,000 revolutions per minute, but, comparatively, a high nominal torque (low speed/high torque machine). The comparatively high nominal torque is supposed to include in particular that the nominal torque of the secondary electric machine is greater than the nominal torque of the primary electric machine, e.g., more than double the amount.

When operated in the generator mode, the secondary electric machine is able to convert an excess of mechanical energy of the high-speed electric machine into electric current. When operated in the generator mode, the electric current produced by the secondary electric machine, according to a first possibility, can be stored in a battery or, according to a second possibility, it can be fed into the high-speed electric machine for driving same. Alternatively, the secondary electric machine can be operated in motor mode, wherein the stator is driven by electric energy for introducing torque into the regulating element of the superimposed transmission. The electric energy can be taken from the battery or it can be provided by the high-speed electric machine. When controlling in a motor mode, the torque and, respectively, the rotational speed generated by the low-speed electric machine and by the high-speed electric machine are superimposed on one another and jointly transmitted to the driven element. Thereby, the low-speed electric machine can advantageously be operated such that the high-speed electric machine operates in a range of maximum efficiency.

The secondary electric machine is preferably configured in the form of an induction machine, i.e. an asynchronous machine. Alternatively, the secondary electric machine can be provided in the form a one-phase, two-phase or three-phase electric machine, for example a permanent magnet machine (PM) or a switched reluctance machine (SRM).

It is possible for all the above-mentioned embodiments that the high-speed electric machine and the regulating element of the superimposed transmission are arranged coaxially relative to the axis of rotation, wherein it is to be understood that, depending on the space available in the motor vehicle, other assemblies are also possible.

The high-speed electric machine can be configured as a three-phase electric machine, in particular as a permanent magnet synchronised machine (PMSM), as an asynchronous machine (ASM), or a switched reluctance machine (SRM). The electric machine comprises a stationary stator and the high-speed rotor which is rotatable therein and which is drivingly connected to the drive element of the superimposed transmission. The high-speed electric machine is configured such that the generated rotational speed and/or the generated torque can be variably adjusted. The high-speed electric machine provides the main force and determines the direction of rotation of the electric drive. The stator of the regulating device generally follows the rotational movement of the high-speed electric machine, wherein the controlling device at the same time allows the rotational speed and the torque of the electric drive to be controlled. To that extent the assembly functions like a drive with a continuously variable transmission (CVT).

The superimposed transmission can be provided in the form of a planetary gearing which comprises a sun gear, a plurality of planetary gears, a planetary carrier and a hollow gear. It can be proposed in particular that the sun gear is connected to the drive element or forms the same, that the hollow gear is connected to the regulating element or forms same and that the planetary carrier is connected to the driven gear or forms same. Further, a different kind of association is also possible, for instance that the hollow gear is connected to the driven element and the planetary carrier to the regulating element.

The hollow gear and the regulating element can be produced in one piece or firmly connected to one another, which can be achieved by a common form-locking connection such as a bolted or shaft-hub connection, force-locking connections such as press-fits, material-locking connections such as welding or combinations of the above possibilities. The rotor of the electromagnetic regulating device can be fixed to an outer face of the regulating element.

The superimposed transmission can be configured as a toothed transmission, i.e., the sun gear, the planetary gears and the hollow gears are provided as toothed gears and engage each other. Alternatively, the superimposed transmission can also be configured as a rolling contact member transmission, i.e. the transmission of torque between the individual elements of the transmission is achieved via force-locking connections. In this case, the sun gear, the planetary carrier and the hollow gear are provided in the form of rotation-symmetrical rolling contact members which roll against one another. More specifically, the sun gear and the planetary gears each comprise cylindrical outer faces which are connected to one another in a force-locking, respectively friction-locking way. The hollow gear comprises a cylindrical inner face which is in friction contact with the outer faces of the planetary gears. The mode of functioning of the rolling contact member transmission is identical to that of a corresponding toothed gear transmission, with the only difference being that the torque is transmitted by force-locking instead of form-locking connections. Such rolling contact member transmissions, which are also referred to as traction drives, are characterised by a low running noise.

According to an embodiment it is possible that the stator of the electromagnetic regulating device and the stator of the high-speed electric machine partially overlap radially. This results in a compact configuration. More particularly, the planetary transmission can be arranged radially inside the regulating device, wherein the rotor of the regulating device and the planetary carrier can be arranged so as to axially overlap.

Further included in this disclosure is a method of controlling the above-mentioned electric drive assembly which can be configured according to one or more of said embodiments, having the following steps: controlling the high-speed electric machine such that the high-speed rotor rotates at a speed of at least 20,000 revolutions per minute; controlling the electromagnetic regulating device in a motor mode to generate a variable rotational speed of the regulating element, with the rotational speed of the high-speed electric machine and the variable rotational speed of the regulating element being superimposed for driving the driven element; wherein the variable rotational speed of the regulating element being set by the electro-magnetic regulating device such that the driven element rotates at a nominal speed.

According to a method embodiment, the following steps can be provided: controlling the electromagnetic regulating device in the generator mode such that any excess of kinetic energy of the high-speed rotor is at least partially converted into electric energy; and storing the electric energy in a battery. The kinetic energy can be generated either by the high-speed rotor alone or optionally by the high-speed rotor together with an additional mass connected thereto.

Example embodiments will be described below with reference to the drawings, wherein:

FIG. 1 shows an example electric drive assembly in a first embodiment in half a longitudinal section;

FIG. 2 shows an electromagnetic regulating device of the electric drive assembly according to FIG. 1 in an axial view;

FIG. 3 shows the electromagnetic regulating device according to FIG. 2 in a longitudinal section along sectional line III-III;

FIG. 4 shows the stator of the electromagnetic regulating device according to FIG. 2 in a perspective view;

FIG. 5 shows the rotor of the electromagnetic regulating device according to FIG. 2 in a perspective view;

Figure 9:
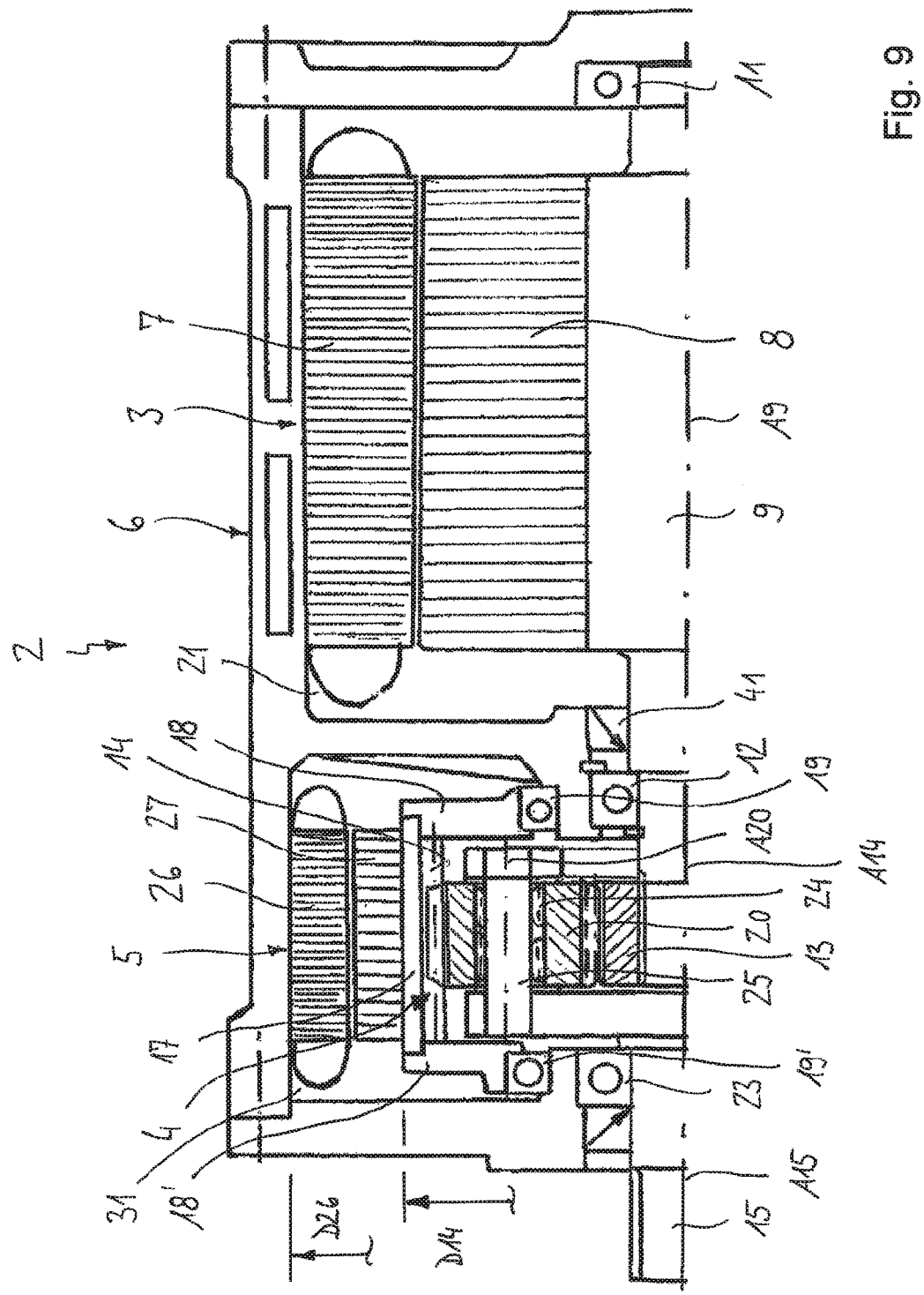
FIG. 9 shows another example electric drive assembly in half a longitudinal section.
Figure 10:
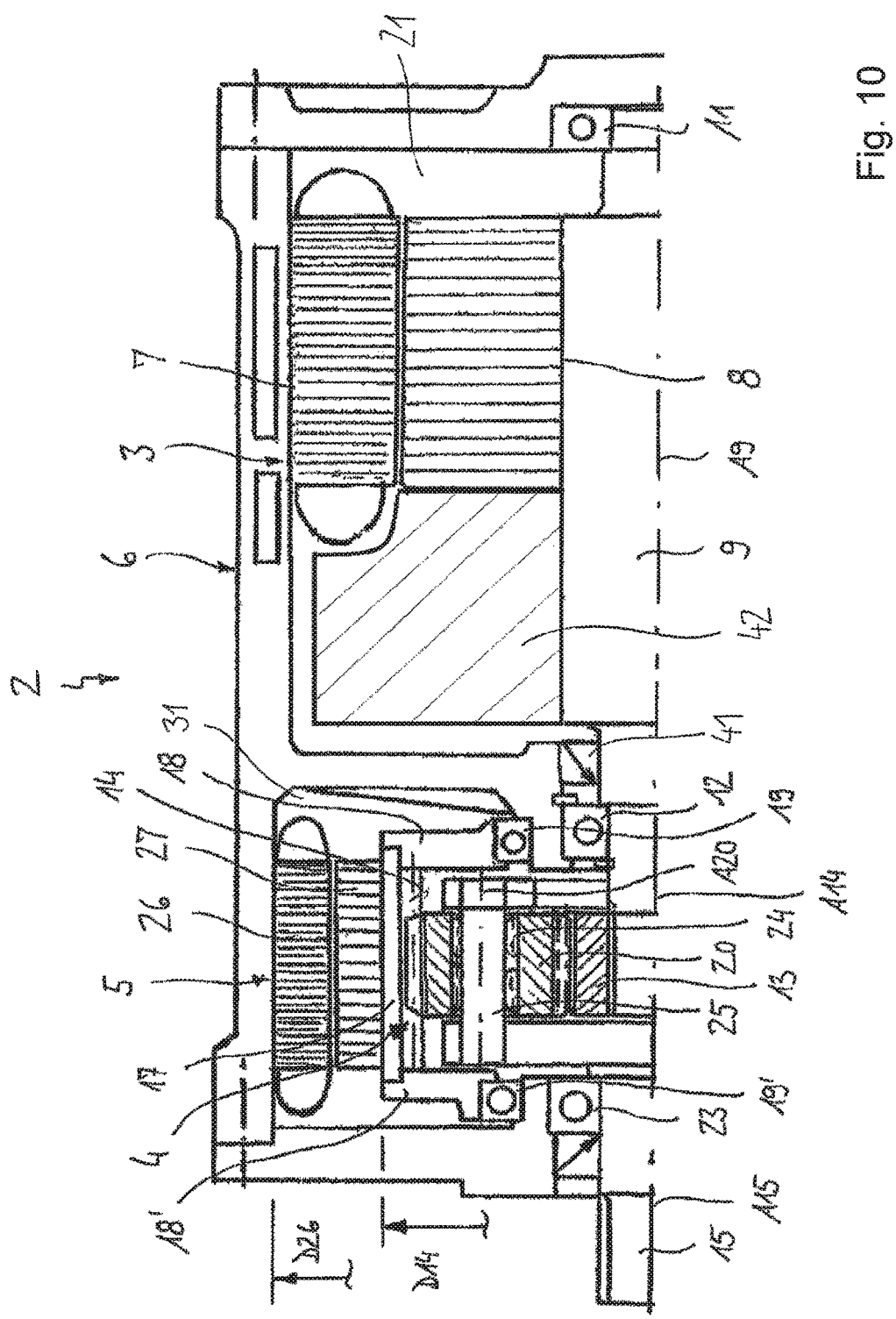
FIG. 10 shows an inventive electric drive assembly in a third embodiment in half a longitudinal section.
Figure 12:
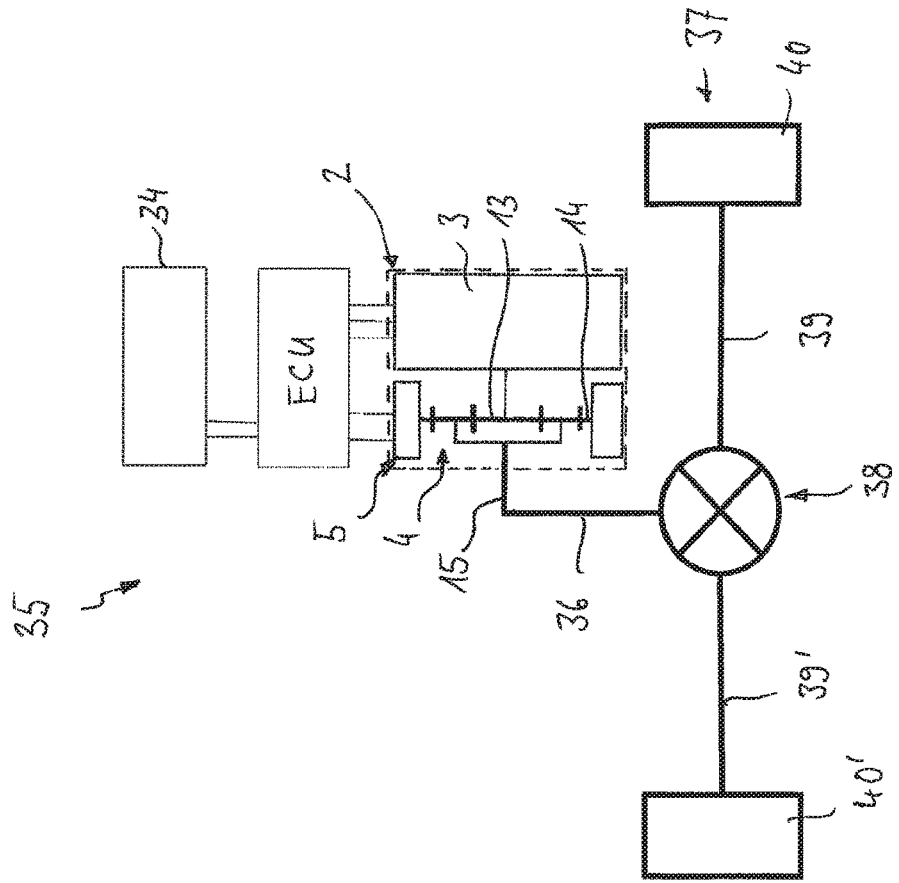
Figure 11:
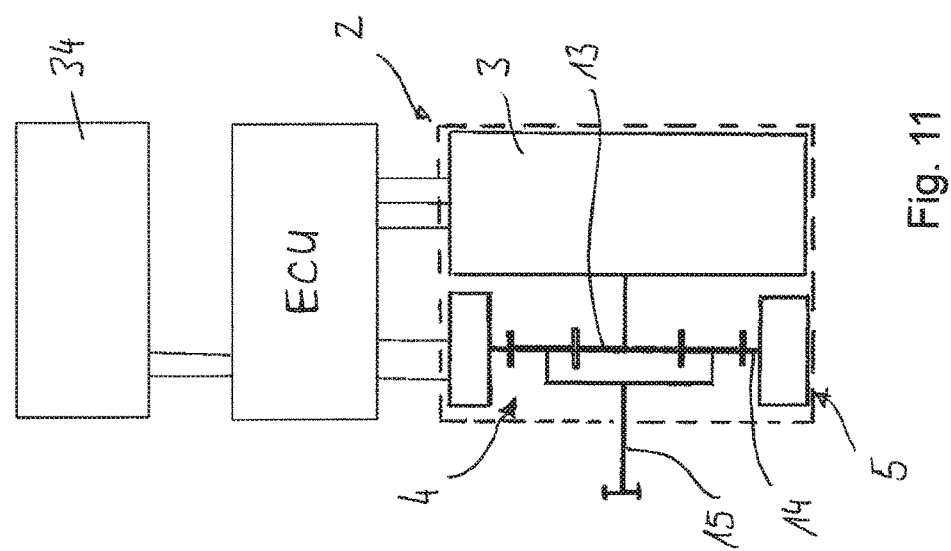

FIG. 11 shown an electric drive assembly according to FIG. 1, FIG. 9 or FIG. 10 in a schematic view; and FIG. 12 shows a driveline assembly in an example electric drive assembly according to FIG. 11.

Below, FIGS. 1 to 5 will be described jointly. FIG. 1 shows an example electric drive assembly 2 for driving a motor vehicle in a first embodiment in half a longitudinal section. The electric drive assembly 2 comprises an electric machine 3, a superimposed transmission 4 that is drivingly connected to the electric machine 3, and an electromagnetic regulating device 5 for controlling the rotational speed of the electric drive assembly 2. The regulating device 5 is shown in detail in FIGS. 2 to 5. The electric machine 3, the superimposed transmission 4 and the regulating device 5 are accommodated in a housing 6 that can be provided in several parts.

The electric machine 3 serves as the primary driving source and determines the direction of rotation of the electric drive assembly 2, wherein the regulating device 5 can be optionally operated as a secondary driving source, which will be explained in greater detail below. The electric machine 3 is controlled by an electronic control unit (ECU). For supplying electric current, the electric machine 3 is connected to a battery (not shown). The electric machine 3 comprises a nominal rotational speed of at least 20,000 revolutions per minute (r.p.m.), and in that sense is configured as a high-speed electric machine. Nominal rotational speeds of at least 25,000 r.p.m. are also possible, wherein peak speeds can even exceed 30,000 r.p.m. The electric machine 3 comprises a stator 7 which is firmly connected to the housing 6 and which can also be referred to as the first stator, as well as a high-speed rotor 8 which is firmly connected to a motor shaft 9 to transmit torque. The motor shaft 9 is supported by means of a first and second bearing 11, 12 so as to be rotatable around the rotational axis A9 by the housing 6, and is rotatingly drivable by the high-speed rotor 8. The high-speed electric machine 3 can run in a dry condition, i.e. it can be operated without any lubricant. For this purpose, the housing 6 comprises a sealed first receiving chamber 21 for the electric machine 34. The receiving chamber 21 is preferably at least partially vacuumised, i.e. the pressure is lower than the environmental pressure, so that even at high rotational speeds, the friction losses through air friction remain low. For example, the internal pressure can amount of less than 100 millibar.

If the need for driving power is lower than the power made available by the electric machine 3, the rotor 8 can serve as a flywheel mass for storing kinetic energy. Because the machine is configured as a high-speed electric machine with the related high rotational speeds, a correspondingly large amount of kinetic energy can be stored. The amount of available kinetic energy and the storage capacity of the electric machine depend on the rotational speed and on the mass inertia of the high-speed rotor 8. To achieve a high storage capacity, the high-speed electric machine 3, in respect of mass inertia and nominal rotational speed is configured in particular such that the high-speed rotor can store a kinetic energy of at least 50 kilo-joule (kj). This amount of energy constitutes more than 2.5 times the storage capacity of a conventional electric machine which, at a maximum rotational speed, comprises a kinetic energy of less than 20 kj. The electric machine 3 can also comprise a greater storage capacity, for example in excess of 100 kilo-joule.

The high-speed electric machine 3 can be provided in the form of a three-phase electric machine, i.e. it is operated with three-phase alternating current. For example, the electric machine can be configured as a permanent magnet net synchronous machine (PMSM), as an asynchronous machine (ASM) or as a switched reluctance machine (SRM).

The superimposed transmission 4 comprises an drive element 13 that is drivingly connected to the electric machine, a regulating element 14 that is operationally connected to the regulating device 5, and a driven element 14 that, for transmitting torque, is to be connected to a drive axle of the motor vehicle (see FIG. 11). Of said three elements, two are rotatable independently of one another, i.e., the transmission has two degrees of freedom. As a result, rotational movements of two of the three elements which movements being independent from one another can be superimposed on one another. The electromagnetic regulating device 5, by acting accordingly on the rotational movement of the regulating element 14, allows a variable control of the revolution speed and of the torque at the driven element 15 and/or at the vehicle driveline drivingly connected thereto. The respective power P effective at the elements in the driveline is a function of the respective torque M and of the respective rotary speed ($P=2 \cdot \pi \cdot M \cdot n$). This means that the moment M5 at the regulating device 5 is dependent on the moment M3 at the high-speed electronic machine 3 and on the total transmission ratio i4 of the superimposed transmission 4 ($M5=i4 \cdot M3$).

The superimposed transmission 4 is provided in the form of a planetary gearing which comprises a sun gear 13, a plurality of planetary gears 20, a planetary carrier 15 and a hollow gear 14. The planetary gears 20 are rotatably supported in the planetary carrier 15 on planetary rotational axes A20 and jointly rotate with the planetary carrier 15 around the axis of rotation A15. The planetary gears 20 engage the sun gear 13 and the hollow gear 14. The sun gear forms the drive element 13 via which a drive torque is introduced from the electric machine 3 into the planetary gearing set, the hollow gear forms the regulating element 14 via which a regulating torque is introduced from the regulating device 5, whereas the planetary carrier 15 forms the driven element that is connected to an output gear 16 for transmitting torque to the driveline which follows in the power path. A different association of parts is also conceivable, for example that the hollow gear is connected to the driven element, with the planetary carrier being connected to the regulating element.

The regulating element 14 is supported on the housing 6 by a bearing 19 so as to be rotatable around a regulating axis A14. In the present embodiment the axis of rotation A14 of the regulating element 14 is arranged coaxially relative to the axis of rotation A9 of the electric machine 3, i.e. coincides with same. However, depending on the space available, it is also possible that the electric machine 3 is arranged relative to the transmission 4 such that their rotational axes extend parallel or at an angle relative to one another. The regulating element 14 has an annular portion 17 with an outer face and a flange portion 18 which, at one axial end of the annular portion 17, is connected to same. The annular portion 17 has an outer face to which a rotor of the regulating device 5 is attached in a rotationally fixed manner which will be explained below in greater detail. The flange portion 18 is rotatably supported by the bearing 19 in a housing part of the housing 6. The housing 6 comprises a second receiving chamber 31 which receives the regulating device 5 and the superimposed transmission 4. The regulating device 5 and the superimposed transmission 4 preferably run under wet conditions, so that the second receiving chamber 31 is at least partially filled with a lubricant. The two receiving chambers 21, 31 are sealed relative to one another by a seal 41.

The planetary carrier 15 is supported by bearings 22, 23 in the housing 6 so as to rotate around the carrier axis A15. The individual planetary gears 20 are rotatably supported by bearings 24 on bolts 25 connected to the planetary carrier 15. The planetary carrier 15, at one side facing away from the motor shaft 9, comprises a sleeve projection to which the driven gear 16 is connected in a rotationally fixed way. The driven gear 16 drives a driveshaft (not shown) of the driveline following thereafter.

In the present embodiment, the regulating device 5 comprises an electromagnetic clutch that comprises a rotor 27 connected to the hollow gear 14, as well as a stator 26 that is connected to the housing 6 so as to be rotationally fixed and that can also be referred to as the second stator. As can be seen in particular in FIGS. 2 to 5, the stator 26 comprises a plurality of circumferentially distributed stator poles 28 and the rotor 27 a plurality of circumferentially distributed rotor poles 29. It can be seen that the stator poles 28 are formed by the teeth of an inner tooth structure at the stator 26. Accordingly, the rotor poles 29 are formed by the teeth of an outer tooth structure at the rotor 27. Between the tooth heads of the stator poles 28 and the teeth heads of the rotor poles 29 there is formed a radial gap, i.e. the stator 26 and the rotor 27 transmit magnetic forces and torque respectively in a contact-free way. In the present embodiment, the number of stator poles and rotor poles is the same, but they may also have different numbers. The rotor 27 is produced from a magnetic material such as soft iron or electric sheet. The stator 26 comprises a magnetic coil 30 which by being supplied with current, generates a magnetic field. The magnetic field acts from the stator poles 28 to the rotor poles 29, so that torque is applied to the rotor 27. The stator 26 of the electromagnetic clutch 5 comprises in the present embodiment a first ring part 32 and a second ring part 33 made of a magnetic material, which, if viewed in half a longitudinal section, is C-shaped. One of the two ring parts 32, 33 forms a magnetic N-pole, whereas the other one forms a magnetic S-pole. The magnetic coil is received axially between the two ring parts 32, 33 and by supplying current, generates the magnetic field F.

The magnetic coil 30 is controlled by an electronic control unit (ECU), with the regulating moment being variably adjustable by controlling the current flowing through the magnetic coil 30. The reaction behaviour of the electromagnetic clutch 5 is extremely fast, according to the setting of the magnetic field. The rotational speed of the rotor 27 is set by pulsating the current of the magnetic coil 30, wherein, by controlling the current accordingly, a soft connection and disconnection of the clutch and accurate controllability of the regulating moment can be achieved. When no current is supplied to the magnetic coil 30, the rotor 27 can rotate freely relative to the stator 26, so that, as the case may be, any torque introduced by the primary drive 3 is not supported. When the magnetic coil 30 is supplied with current, the rotor can be held so as to be rotationally fixed relative to the stator, so that the torque introduced by the primary drive 3 is supported and transmitted to the driven element 15. By suitably pulsing of the coil current, the rotor 27 can also be made to run ahead or follow the stator 26, so that the revolution speed of the electric drive assembly can be controlled as required. If the total torque introduced into the driveline exceeds the set coil current, the rotor 27 rotates relative to the stator 26, in which case the electromagnetic clutch 5 constitutes an overload protection mechanism.

It can be seen that the size conditions of the assembly are such that the stator 26 of the regulating device 5 comprises a greatest outer diameter D26 and/or a smallest inner diameter which is greater than a greatest outer diameter D14 of the hollow gear 14. Furthermore, the stator 26 of the regulating device 5 radially overlaps with the stator 7 of the primary electric machine 3. By this configuration, the stator 26 of the regulating device 5 is positioned on a relatively large diameter, so that the magnetic forces and the current in the regulating device can be relatively low.

Figure 8:
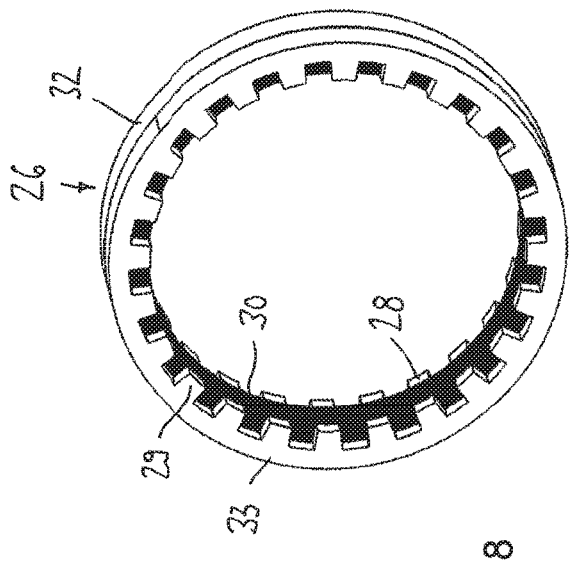
FIG. 8 shows the stator of the electromagnetic regulating device according to FIG. 6 in a perspective view.
Figure 7:
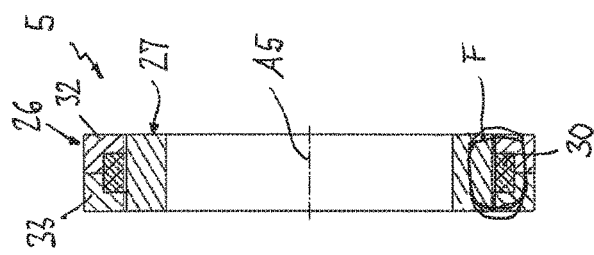
FIG. 7 shows the electromagnetic regulating device according to FIG. 6 in a longitudinal section according to the sectional line VII-VII.
Figure 6:
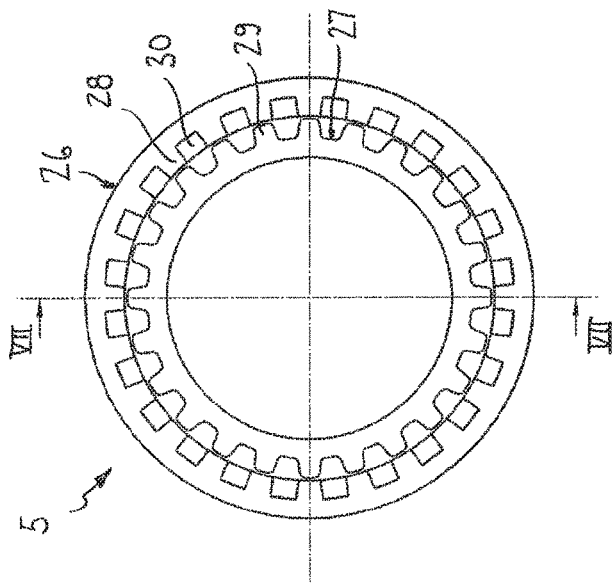
FIG. 6 shows an electromagnetic regulating device in a modified embodiment in an axial view.

FIGS. 6 to 8 show an electromagnetic clutch in an embodiment which is slightly modified relative to the embodiment according to FIGS. 2 to 5. The present embodiment that can be used instead of the electromagnetic clutch shown in FIG. 1, largely corresponds to the above embodiment, so that in respect of their common features, reference can be made to the above description. Identical specifications or specifications corresponding to one another have been given the same reference numbers.

The only difference of the embodiment according FIGS. 6 to 8 refers to the configuration of the stator 26 which, in the present embodiment, if viewed in half a longitudinal section, comprises L-shaped ring parts 32, 33 which laterally embrace the magnetic coil 30. The inner diameter of the magnetic coil 30 corresponds to the inner diameter of the ring parts 32, 33. Compared with the above embodiment, the radial annular gap between the magnetic coil 30 and the rotor 27 is clearly reduced. The rotor 27 is identical to that in the above embodiment.

FIG. 9 shows an example electric drive assembly in a second embodiment which largely corresponds to that shown in FIGS. 1 to 5 to whose description, as regards common features, reference is hereby made. Identical specifications and specifications corresponding to one another have been given the same reference numbers as in FIG. 1.

A specific feature of the present embodiment according to FIG. 9 refers to the configuration of the electro-magnetic regulating device 5 which is provided in the form of an electric machine. The electric machine 5 forms a secondary electric machine of the electric drive assembly, i.e., the primary electric machine 3 comprises a higher nominal power and substantially, provides the driving moment, the driving power and the rotational driving direction, whereas the secondary electric machine comprises a lower nominal power and serves for adjusting the accurate rotational speed and driving moment respectively. More specifically, the secondary electric machine 3 can be provided in the form of a one-phase electric machine, but in principle a two- or three-phase electric machine such as a permanent magnet machine (PM) or a switched reluctance machine (SRM) can also be used.

The secondary electric machine 5 can be operated in a generator mode or motor mode, wherein control is effected by an electronic control unit (ECU). In particular, it is proposed that the secondary electric machine 5 is designed as a low-speed electric machine which comprises a relatively low nominal rotational speed of, for example, less than 500 revolutions per minute, but a comparatively high nominal torque (low speed/high speed torque machine). When operated in generator mode, the secondary electric machine 5 can convert an excess of mechanical energy of the high-speed electric machine 3 into electric current. For this purpose, a battery 34 is provided to which the secondary electric machine 5 is connected for storing the current generated in the generator mode of operation. Alternatively, the secondary electric machine 5 is controllable in a motor mode, wherein the stator 26 is driven by electric energy for introducing torque into the regulating element 14 of the superimposed transmission 4. In this case, the torque and rotational speeds generated by the secondary electric machine 5 and by the primary electric machine 3 are superimposed on one another and jointly transmitted to the drive element 15.

The primary electric machine 3 and the secondary electric machine 5 are arranged coaxially relative to one another, wherein the secondary electric machine 5 and the stator 7 of the primary electric machine 3 at least partially radially overlap. Furthermore, it can be seen that the superimposed transmission 4 is arranged coaxially and radially inside the secondary electric machine 5. The rotor 27 of the electric machine 5 is connected to the outer face of the regulating element 14, so that both jointly rotate around the axis of rotation A14. The regulating element respectively hollow gear 14 comprise two flange portions 18, 18', by means of which, via bearings 19, it is supported in the housing 6 around the axis of rotation A14. The planetary gears 20 are arranged so as to axially overlap with the electric machine 5. Overall this type of configuration results in a compact assembly and, depending on the space conditions in the motor vehicle, other embodiments are also possible.

FIG. 10 shows an example electric drive assembly in a third embodiment which largely corresponds to that according to FIG. 9 to the description of which reference is hereby made with regard to the common features. Identical specifications and specifications corresponding to one another have been given the same reference numbers as in FIG. 9 and/or FIG. 1.

A difference between the embodiment according to FIG. 10 relative to that the embodiment according to FIG. 9 is that there is provided an additional mass 42 for increasing the mass inertia and thus the storage capacity of the high-speed electric machine 3. The additional mass 42 is connected to the high-speed rotor 8, respectively the driveshaft 9 so that the three parts rotate jointly with one another. The additional mass 42 achieves a higher rotational energy of the high-speed rotor 8 so that this electric machine 3 comprises a high storage capacity. Said storage capacity can be in excess of 50 kilo-joule, e.g., more than 100 kilo-joule and, depending on the rotational speed of the electric machine 3 perhaps in excess of 200 kilo-joule.

FIG. 11 is a schematic illustration of an inventive electric drive assembly 2 according to FIG. 1, FIG. 9 and FIG. 10 respectively, having an electronic control unit ECU and a battery 34 which supplies electric energy to the electromagnetic regulating device 5 and the primary electric machine 3 and, respectively, in which electric energy can also be stored in generator mode of operation.

FIG. 12 shows an example driveline 35 with an example electric drive assembly 2 according to FIG. 11. The driveline 35, in addition to the electric drive assembly 2, also comprises a driveshaft 36 for driving a drive axle 37 of the motor vehicle. The drive axle 37 comprises an axle differential 38 with a differential gear set and two sideshafts 39, 39' which are each drivingly connected to a vehicle wheel 40, 40'. The torque introduced by the driveshaft 36 is divided by the axle differential 38 and passed to the two sideshafts 39, 39'.

The example electric drive assembly 2 advantageously comprises only minimum drag losses and thus a high degree of efficiency. By using an electromagnetic regulating device 5 the rotational speed and the torque in the driveline of the electric drive respectively can be variably adjusted, so that the high-speed electric machine can be operated in a particularly efficient characteristic curve range. Furthermore, by configuring the electromagnetic regulating device as proposed, an overload protection against any torque peaks that might occur is provided. Overall, the electric drive combines the advantages of a high degree of efficiency and long service life with a compact design.

The invention claimed is:

1. An electric drive assembly for driving a motor vehicle, comprising:
    an electric machine which is configured as a high-speed electric machine with a nominal speed of at least 20,000 revolutions per minute and is provided with a high-speed rotor which is usable as a flywheel mass to store kinetic energy;
    a superimposed transmission with exactly three connecting elements, consisting of a drive element, a regulating element, and a driven element, wherein the superimposed transmission is configured in the form of a planetary transmission with a sun gear that forms the drive element and that is rotatingly driveable by the electric machine around a driving axis at more than 20,000 revolutions per minute, and with a hollow gear that is produced as one piece with, or connected to, the regulating element and is rotatable around a regulating axis, and with a planetary carrier that forms the driven element and carries a plurality of planetary gears via which the hollow gear and the sun gear are drivingly connected;
    an electro-magnetic regulating device that is coaxially arranged relative to the superimposed transmission and provided for variably regulating a rotational speed of the regulating element, wherein the electromagnetic regulating device comprises a stator that is connected to a stationary component and a rotor that is connected to the regulating element of the superimposed transmission in a rotationally fixed way, wherein the rotor and the stator are contactlessly arranged relative to each other, wherein the electromagnetic regulating device is configured to transmit a regulating torque to the rotor by magnetic forces acting in circumferential direction between the stator and the rotor, wherein the magnetic forces are variably adjustable,
    wherein the high-speed electric machine is arranged in a sealed dry first receiving chamber, wherein an internal pressure in the first receiving chamber is lower than an environmental pressure, and
    wherein the electromagnetic regulating device and the superimposed transmission are arranged in a sealed second receiving chamber filled with lubricant, wherein the superimposed transmission is arranged radially inside the electromagnetic regulating device.

2. The electric drive assembly of claim 1,
    further comprising a housing, wherein the regulating element comprises two flange portions by which, via bearings, the regulating element is rotatably supported in the housing.

3. The electric drive assembly of claim 1,
    wherein an additional mass is provided that is at least indirectly firmly connected to the high-speed rotor, wherein the additional mass is arranged in the first receiving chamber.

4. The electric drive assembly of claim 1,
    wherein the high-speed electric machine is configured such that the high-speed rotor can store a kinetic energy of at least 50 kilo-joule.

5. The electric drive assembly of claim 1,
    wherein the stator of the regulating device comprises a greatest outer diameter that is greater than an outer diameter of the hollow gear of the superimposed transmission that is arranged coaxially relative to the axis of rotation.

6. The electric drive assembly of claim 1,
    wherein the stator of the regulating device comprises a plurality of circumferentially distributed stator poles and the rotor comprises a plurality of circumferentially distributed rotor poles, wherein the number of stator poles is identical to the number of rotor poles.

7. The electric drive assembly of claim 6,
    wherein the stator poles are formed by the teeth of an inner tooth structure at the stator and the rotor poles are formed by the teeth of an outer tooth structure at the rotor, wherein a radial gap is formed between the tooth heads of the stator poles and the tooth heads of the rotor poles.

8. The electric drive assembly of claim 1,
    wherein the rotational speed of the rotor is variably adjustable by pulsing of the current of the electromagnetic regulating device such that the rotor rotates in a same direction, or in an opposed direction, of rotation as the drive element.

9. The electric drive assembly of claim 1,
    wherein the electromagnetic regulating device operates according to a principle of reluctance, wherein the rotor consists of a magnetic material and the stator comprises at least one magnetic coil which, upon being energized, generates a magnetic field.

10. The electric drive assembly of claim 9,
    wherein the stator comprises at least one first ring part and at least one second ring part made of a magnetic material, between which the at least one magnetic coil is axially received.

11. The electric drive assembly of claim 1,
wherein the electromagnetic regulating device comprises a secondary electric machine,
wherein the secondary electric machine is operable in a generator mode to transform an excess of mechanical energy of the high-speed electric machine into electric current, wherein the electric current is storable in a battery or is feedable into the high-speed electric machine, and
wherein the secondary electric machine is operable in a motor mode, wherein the rotor is driven by electric energy in the direction of rotation of the drive element to introduce torque into the regulating element of the superimposed transmission, wherein the electric energy is taken from the battery or is provided by the high-speed electric machine.

12. The electric drive assembly of claim 1,
wherein the high-speed electric machine and the regulating element of the superimposed transmission are arranged coaxially relative to the rotational driving axis.

13. The electric drive assembly of claim 1,
wherein the high-speed electric machine is configured as a three-phase electric machine and comprises a stator in which the high-speed rotor is rotatably arranged, wherein the high-speed rotor is drivingly connected to the drive element of the superimposed transmission.

14. The electric drive assembly of claim 1,
wherein the stator of the electromagnetic regulating device and the stator of the electric machine at least partially overlap each other radially.

15. The electric drive assembly of claim 1,
wherein the hollow gear and the regulating element are formed in one piece, wherein the rotor of the electromagnetic regulating device is attached to an outer face of the regulating element in a rotationally fixed manner.

16. The electric drive assembly of claim 1,
wherein the first receiving chamber and the second receiving chamber are axially adjacent to one another.

17. The electric drive assembly of claim 1,
wherein the internal pressure in the first receiving chamber is permanently lower than the environmental pressure.

18. A method of controlling an electric drive assembly that comprises
an electric machine which is configured as a high-speed electric machine with a nominal speed of at least 20,000 revolutions per minute and is provided with a high-speed rotor which is usable as a flywheel mass to store kinetic energy;
a superimposed transmission with exactly three connecting elements, consisting of a drive element, a regulating element, and a driven element, wherein the superimposed transmission is configured in the form of a planetary transmission with a sun gear that forms the drive element and that is rotatingly driveable by the electric machine around a driving axis at more than 20,000 revolutions per minute, and with a hollow gear that is connected to the regulating element and is rotatable around a regulating axis, and with a planetary carrier that forms the driven element and carries a plurality of planetary gears via which the hollow gear and the sun are drivingly connected;
an electro-magnetic regulating device that is coaxially arranged relative to the superimposed transmission and provided for variably regulating a rotational speed of the regulating element, wherein the electromagnetic regulating device comprises a stator that is connected to a stationary component and a rotor that is connected to the regulating element of the superimposed transmission in a rotationally fixed way, wherein the rotor and the stator are contactlessly arranged relative to each other, wherein the electromagnetic regulating device is configured to transmit a regulating torque to the rotor by magnetic forces acting in circumferential direction between the stator and the rotor, wherein the magnetic forces are variably adjustable,
wherein the high-speed electric machine is arranged in a sealed dry first receiving chamber, wherein an internal pressure in the first receiving chamber is lower than an environmental pressure, and
wherein the electromagnetic regulating device and the superimposed transmission are arranged in a sealed second receiving chamber filled with lubricant, wherein the superimposed transmission is arranged radially inside the electromagnetic regulating device;
the method comprising:
controlling the high-speed electric machine such that the high-speed rotor rotates at a speed of at least 20,000 revolutions per minute;
controlling the electromagnetic regulating device in a motor mode for generating a variable rotational speed of the regulating element, wherein the rotational speed of the high-speed electric machine and the variable rotational speed of the regulating element superimpose one another for driving the driven element;
wherein the variable speed of the regulating element is set by the electromagnetic regulating device such that the drive element rotates at a nominal speed.

19. The method of claim 18, further comprising:
controlling the electromagnetic regulating device in a generator mode such that an excess of kinetic energy of the high-speed rotor is at least partially converted into electric energy; and
storing the electric energy in a battery.

* * * * *